3,312,733
OPTICALLY ACTIVE NAPHTHYLETHANOL-
AMINES AND THE SALTS THEREOF
Ralph Howe, Macclesfield, England, assignor to Imperial Chemical Industries Limited, London, England, a corporation of Great Britain
No Drawing. Filed Aug. 13, 1962, Ser. No. 216,344
Claims priority, application Great Britain, Sept. 15, 1961, 33,157/61
7 Claims. (Cl. 260—501)

This invention relates to nitrogen-containing organic compounds and more particularly it relates to naphthalene derivatives which possess valuable therapeutic properties.

In United Kingdom patent applications Nos. 15,716/60 and 46,034/61, now British Patent No. 909,357 and British Patent No. 1,005,025, there are described and claimed certain naphthalene derivatives which are β-adrenergic blocking agents and which are therefore of value in the treatment or prophylaxis of coronary artery disease. These naphthalene derivatives are racemic compounds which have not hitherto been resolved into the corresponding optically active compounds.

We have now found that these naphthalene derivatives can be resolved into the corresponding optically active compounds, dextro(+) or laevo(−) rotatory, and these compounds are, in certain respects, for example in respect of therapeutic ratio, superior to the parent racemic naphthalene derivatives in their pharmacological and therapeutic properties.

According to the invention we provide optically active naphthalene derivatives of the formula:

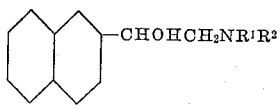

wherein $R^1$ stands for hydrogen or a methyl radical, wherein $R_2$ stands for an alkyl radical, optionally substituted, and wherein the naphthalene nucleus may optionally bear one or more halogen, hydroxy, lower alkyl or lower alkoxy substituents, and the non-toxic pharmaceutically-acceptable salts thereof.

It is to be understood that the said optically active naphthalene derivatives may be dextro-rotatory (+) of laevo-rotatory (−). It is to be further understood that, when the substituent $R^2$ stands for a radical which contains an element or elements of asymmetry, a pair of compounds of this invention may be disastereoisomers and not simply enantiomorphs as in the case where the substituent $R^2$ contains no element of asymmetry. A member of a pair of disasteroisomers will, of course, not necessarily possess the same specific rotation as the other member.

As a suitable value for $R^2$ there may be mentioned, for example, a straight- or branched-chain alkyl radical of not more than 20 carbon atoms, for example the isopropyl, isobutyl, sec.-butyl, tert.-butyl, 3-n-pentyl, 2-n-pentyl, 3-methyl-2-n-butyl or 3-n-heptyl radical. Alternatively, $R^2$ may stand for a straight- or branched-chain alkyl radical of not more than 20 carbon atoms bearing one or more substituents selected from hydroxy, alkoxy, substituted amino, aryl, for example phenyl, and substituted aryl, for example substituted phenyl, for example alkoxyphenyl, dialkoxyphenyl or trialkoxyphenyl, radicals. Thus, for example, $R^2$ may stand for an aralkyl radical, for example a phenylalkyl radical, wherein the aryl radical or the alkyl radical, or both, may optionally bear one or more additional substituents, for example alkyl or alkoxy substituents. Specific values for $R^2$ when it stands for a substituted alkyl radical are the 1-hydroxy-2-methyl-2-n-propyl, 1-hydroxy-2-n-butyl, 1-phenyl-2-n-propyl and 2-(3′:4′-dimethoxyphenyl)ethyl radicals.

As suitable substituents in the naphthalene nucleus there may be mentioned, for example, chlorine or bromine atoms or hydroxy, methyl, ethyl, methoxy or ethoxy radicals.

Particularly valuable compounds of the present invention are (−)-1-(2′-naphthyl)-2-isopropylaminoethanol, M.P. 108–109° C., $[\alpha]_D^{21}$ −29° (c., 1.03 in ethanol), (−)-1-(2′-naphthyl)-2-(1′-hydroxy-2′-methyl-2′-n-propylamino)ethanol, M.P. 117° C., $[\alpha]_D^{21}$ −26.6° (c., 1.00 in ethanol), and (−)-1-(2′-naphthyl)-2-(1′-phenyl-2′-n-propylamino)ethanol, M.P. 104° C., $[\alpha]_D^{21}$ −18.9° (c., 1.03 in ethanol), and the non-toxic pharmaceutically-acceptable salts thereof.

The salts of the said optically active naphthalene derivatives may be, for example, salts derived from inorganic acids, for example hydrochlorides, hydrobromides, phosphates or sulphates, or salts derived from organic acids, for example oxalates, lactates, tartrates, O:O-di-p-toluoyltartrates, acetates, salicylates or citrates.

According to a further feature of the invention we provide a process for the manufacture of the said optically active naphthalene derivatives, which comprises the resolution of the corresponding racemic naphthalene derivatives by means of an optically active acid, recovering the salts so formed, and subsequently, if so desired, liberating the optically active naphthalene derivatives from the recovered salts by conventional means.

Particular racemic naphthalene derivatives which can be used as starting material in the above process are (±)-1-(2′-naphthyl)-2-isopropylaminoethanol, (±)-1-(2′-naphthyl)-2-tert.-butylaminoethanol, (±)-1-(2′-naphthyl)-2-sec.-butylaminoethanol, (±)-1-(2′-naphthyl)-2-isobutylaminoethanol and (±)-1-(2′-naphthyl)-2-(1′-hydroxy-2′-methyl-2′-n-propylamino)ethanol.

As suitable optically active acids for use in the above process there may be mentioned, for example, (+) or (−) O:O-di-p-toluoyltartaric acid, (+) or (−) tartaric acid, (+) or (−) camphor-10-sulphonic acid, or (+) or (−) 3-bromocamphor-8-sulphonic acid.

The process may be carried out in the presence of a diluent or solvent for example aqueous methanol.

The racemic naphthalene derivatives used as starting material may be obtained by reduction of the corresponding 2-naphthacyl halide followed by reaction of the reduction product so obtained with an amine of the formula $NHR^1R^2$ wherein $R^1$ and $R^2$ have the meanings stated above, as described in the said applications Nos. 15,716/60 and 46,034/61, now British Patent No. 909,357 and British Patent No. 1,005,025.

According to a further feature of the invention we provide a process for the manufacture of those of the said optically active naphthalene derivatives wherein $R^1$ stands for hydrogen and $R^2$ stands for an alkyl radical, optionally substituted, containing an asymmetric carbon atom, which comprises the interaction of a carbonyl compound of the formula:

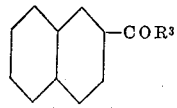

wherein $R^3$ stands for the aldehydo radical (—CHO) or for a radical of the formula —CH(OR$^4$)OR$^5$, wherein $R^4$ and $R^5$, which may be the same or different, stand for hydrogen or a lower alkyl radical, and wherein the naphthalene nucleus may optionally be substituted as indicated above, with an optically active amine of the formula $NH_2R^6$, wherein $R^6$ stands for an alkyl radical, optionally substituted, containing an asymmetric carbon atom, under reducing conditions.

The diastereoisomers thus formed may be separated by conventional means, for example by crystallisation from a suitable solvent.

As a suitable value for $R^6$ when it stands for a substituted alkyl radical containing an asymmetric carbon atom there may be mentioned, for example, any of those of the values given above for $R^2$ when it stands for a substituted alkyl radical wherein the alkyl radical contains an asymmetric carbon atom, for example an aralkyl radical, for example a phenylalkyl radical, wherein the alkyl radical contains an asymmetric carbon atom. Suitable optically active amines for use as starting material are, for example, (+)-1-phenyl-2-n-propylamine, (−)-1-phenyl-2-n-propylamine, (+)-2-amino-1-n-butanol, (−)-2-amino-1-n-butanol, (+)-sec.-butylamine and (−)-sec.-butylamine.

The said reduction may be carried out by catalytic hydrogenation, for example hydrogenation in the presence of a platinum catalyst. The said catalytic hydrogenation may be carried out in an inert diluent or solvent, for example ethanol. The said catalytic hydrogenation may be carried out at atmospheric pressure or at an elevated pressure, and it may be carried out at ambient temperature or at an elevated temperature. Alternatively, the said reduction may be carried out by the use of a metal hydride, for example an alkali metal borohydride, sodium borohydride, in an inert diluent or solvent, for example methanol, at a temperature of about 0–25° C.

Those of the said carbonyl compounds wherein $R^3$ stands for the aldehydo radical, and those wherein $R^4$ and $R^5$ stand for hydrogen, may be obtained by the interaction of the corresponding acetyl derivative with selenium dioxide in a diluent or solvent, for example 80% v./v. acetic acid. The corresponding hemiacetals and acetals may be obtained from the corresponding compounds wherein $R^3$ stands for the aldehydo radical by conventional procedures.

The optically active naphthalene derivatives of this invention are β-adrenergic blocking agents and they are therefore of value in the treatment or prophylaxis of coronary artery disease.

Thus, according to yet a further feature of the invention we provide pharmaceutical compositions comprising as active ingredient one or more of the said optically active naphthalene derivatives, or a non-toxic pharmaceutically acceptable salt thereof, in admixture with diluents or carriers therefor.

As suitable compositions there may be mentioned, for example, tablets, capsules, aqueous or oily solutions, aqueous or oily suspensions, emulsions, injectable aqueous or oily solutions or suspensions, or dispersible powders.

The invention is illustrated but not limited by the following examples in which the parts are by weight:

Example 1

20 parts of (±)-1-(2′-naphthyl)-2-isopropylaminoethanol and 16.85 parts of (−)-O:O-di-p-toluoyltartaric acid are dissolved in a mixture of 135 parts of methanol and 85 parts of water at 50° C., and the solution is allowed to cool slowly to ambient temperature. The mixture is filtered and the filtrate is retained for further examination (see Example 2). 1 part of the residual solid, M.P. 98–101° C., $[\alpha]_D^{21}-60°$ (c., 1.0 in ethanol), is crystallised from 3 parts of aqueous methanol (66% methanol by volume). There is thus obtained di-[(+)-1-(2′-naphthyl)-2-isopropylaminoethanol](−)-O:O-di-p-toluoyltartrate trihydrate, M.P. 106–108° C., $$[\alpha]_D^{21}-41.5°$$

(c., 1.08 in ethanol). The anhydrous salt is obtained by heating the trihydrate in vacuo at 60° C. for three hours; it has M.P. 113–114° C. and $[\alpha]_D^{21}-45°$ (c., 1.3 in ethanol).

The (±)-1-(2′-naphthyl)-2-isopropylaminoethanol used as starting material may be obtained as follows:

A solution of 10 parts of 2-naphthacyl bromide in 180 parts of methanol is stirred, and 3 parts of sodium borohydride are added quickly, the temperature being kept below 25° C. The mixture is stirred at 20° C. for a further 30 minutes and is then poured on to ice and extracted with ether. The ethereal extract is washed with water, dried over sodium sulphate and evaporated to dryness, thus providing a crude reduction product. This product is dissolved in 90 parts of anhydrous ethanol and is heated under reflux with 20 parts of isopropylamine for 16 hours. The solution is then evaporated to dryness under reduced pressure and the solid residue is suspended in 50 parts of water, acidified with hydrobromic acid and allowed to crystallise. The product is crystallised from aqueous acetone, and there is thus obtained (±)-1-(2′-naphthyl)-2-isopropylaminoethanol hydrobromide, M.P. 177–179° C.

90 parts of (±)-1-(2′-naphthyl)-2-isopropylaminoethanol hydrobromide are stirred with 450 parts of water and 8 parts of ethanol, and 50 parts of 10 N sodium hydroxide solution are then added during 15 minutes. The mixture is extracted with 600 parts of benzene in three portions. The benzene extracts are combined, washed with 75 parts of water in three portions and dried with anhydrous magnesium sulphate. The benzene solution is then evaporated to dryness and there is thus obtained as the free base (±)-1-(2′-naphthyl)-2-isopropylaminoethanol which, when crystallised from ethyl acetate, has M.P. 105–106° C.

Example 2

The filtrate obtained in Example 1 is evaporated in vacuo at 18–22° C. until the removal of methanol is complete. The residue is treated with 100 parts of N/2 aqueous sodium hydroxide and the mixture is then extracted with 450 parts of benzene in three portions. The benzene extracts are combined, washed with 75 parts of water in three portions, and dried with anhydrous magnesium sulphate. The dried benzene solution is evaporated to dryness and there is thus obtained optically impure (−)-1-(2′-naphthyl)-2-isopropylaminoethanol, M.P., 102° C., $[\alpha]_D^{21}-17.3°$ (c., 0.98 in ethanol). 9 parts of this optically impure base and 7.58 parts of (+)-O:O-di-p-toluoyltartaric acid are dissolved in a mixture of 60 parts of methanol and 45 parts of water at 50° C., and the solution is allowed to cool slowly to ambient temperature. The mixture is filtered and 1 part of the residual solid, M.P. 102–103° C., $[\alpha]_D^{21}+39°$ (c., 1.07 in ethanol), is crystallised from 3 parts of aqueous methanol (66% methanol by volume). There is thus obtained di[(−)-1-(2′-naphthyl)-2-isopropylaminoethanol] (+)-O:O-di-p-toluoyltartrate trihydrate, M.P. 106–108° C., $[\alpha]_D^{21}+41.4°$ (c., 0.97 in ethanol). The anhydrous salt is obtained by heating the trihydrate in vacuo at 60° C. for three hours; it has M.P. 113–114° C. and $[\alpha]_D^{21}+45°$ (c., 1.0 in ethanol).

Example 3

8.75 parts of di-[(+)-1-(2′-naphthyl)-2-isopropylaminoethanol] (−)-O:O-di-p-toluoyltartrate trihydrate are treated with 50 parts of cold N/2 aqueous sodium hydroxide, and the mixture is extracted with 220 parts of benzene in three portions. The benzene extracts are combined, washed with 30 parts of water in three portions, and dried with anhydrous magnesium sulphate. The dried benzene solution is evaporated to dryness. The residual solid is crystallised from 20 parts of ethyl acetate and there is thus obtained as the free base (+)-1-(2′-naphthyl)-2-isopropylaminoethanol, M.P. 108–109° C., $$[\alpha]_D^{21}+28.4°$$

(c., 0.99 in ethanol).

Example 4

The procedure described in Example 3 is repeated using as starting material di-[(−)-1-(2′-naphthyl)-2-isopropylaminoethanol] (+)-O:O-di-p-toluoyltartrate trihydrate.

There is thus obtained as the free base (−)-1-(2′-naphthyl)-2-isopropylaminoethanol, M.P. 108–109° C., $[\alpha]_D^{21} -29°$ (c., 1.03 in ethanol).

*Example 5*

Ethereal hydrogen chloride is added gradually with stirring at 18–22° C. to a solution of 1 part of (+)-1-(2′-naphthyl)-2-isopropylaminoethanol in 75 parts of ethyl acetate until a slight excess of hydrogen chloride is present. The mixture is filtered. The residual solid is crystallised from a mixture of methanol and ethyl acetate and there is thus obtained (+)-1-(2′-naphthyl)-2-isopropylaminoethanol hydrochloride, M.P. 209–210° C., $[\alpha]_D^{21} +52.3°$ (c., 1.01 in ethanol).

*Example 6*

The procedure described in Example 5 is repeated using as starting material (−)-1-(2′-naphthyl)-2-isopropylaminoethanol. There is thus obtained (−)-1-(2′-naphthyl)-2-isopropylaminoethanol hydrochloride, M.P. 209–210° C., $[\alpha]_D^{21} -52.6°$ (c., 1.02 in ethanol).

*Example 7*

30 parts of ethyl acetate are added to a solution of 1.53 parts of (−)-1-(2′-naphthyl)-2-isopropylaminoethanol and 0.5 part of (+)-tartaric acid in 10 parts of methanol. The solid which separates is crystallised from a mixture of methanol and ethyl acetate, and there is thus obtained di-[(−)-1-(2′-naphthyl)-2-isopropylaminoethanol] (+)-tartrate, M.P. 182° C., $[\alpha]_D^{21} -30°$ (c., 0.99 in water).

*Example 8*

The procedure described in Example 7 is repeated using (−)-tartaric acid in place of (+)-tartaric acid. There is thus obtained di-[(−)-1-(2′-naphthyl)-2-isopropylaminoethanol] (−)-tartrate, M.P. 182° C., $[\alpha]_D^{21} -51°$ (c., 0.98 in water).

*Example 9*

5.18 parts of (±)-1-(2′-naphthyl)-2-(1′-hydroxy-2′-methyl-2′-n-propylamino)ethanol and 7.72 parts of (+)-O:O-di-p-toluoyltartaric acid are dissolved in a mixture of 32 parts of methanol and 18 parts of water at 50° C., and the solution is allowed to cool slowly to ambient temperature. The mixture is filtered and the filtrate is retained for further examination (see Example 12). The residual solid is crystallised several times from methanol until the optical rotation becomes constant. There is thus obtained (+)-1-(2′-naphthyl)-2-(1′-hydroxy-2′-methyl-2′-n-propylamino)ethanol (+)-O:O-di-p-toluoyltartrate, M.P. 162–163° C., $[\alpha]_D^{21} +97.5°$ (c., 1.00 in ethanol).

The (±)-1-(2′-naphthyl)-2-(1′-hydroxy-2′-methyl-2′-n-propylamino)ethanol used as starting material may be obtained as follows:

A solution of 2 parts of 2-amino-2-methyl-1-propanol in 5 parts of methanol is added to a stirred suspension of 3 parts of 2-naphthylglyoxal hydrate in 20 parts of methanol. The mixture is cooled to 0° C. and 0.75 part of sodium borohydride is added during 45 minutes. The mixture is stirred for 60 minutes at 0° C., and the methanol is then evaporated under reduced pressure. 20 Parts of water are added to the residue, and the mixture is extracted with 50 parts of ether. The ethereal extract is washed with 20 parts of water. The ethereal solution is extracted with 100 parts of 0.5 N hydrochloric acid. 60 parts of 1 N sodium hydroxide solution are added to the aqueous acid layer and the mixture is extracted with 100 parts of benzene. The benzene extract is washed with water, dried with anhydrous magnesium sulphate, and then the benzene is evaporated. The residue is crystallised from ethyl acetate. There is thus obtained (±)-1-(2′-naphthyl)-2-(1′-hydroxy-2′-methyl-2′-n-propylamino)ethanol, M.P. 119–120° C.

The 2-naphthylglyoxal hydrate itself may be obtained as follows:

A solution of 4 parts of 2-naphthacyl bromide in 30 parts of dimethyl sulphoxide is kept at ambient temperature during 48 hours. The solution is poured on to 100 parts of ice. The mixture is allowed to warm up to ambient temperature, and is then filtered. The solid residue is crystallised from water giving 2-naphthylglyoxal hydrate, M.P. 110° C.

*Example 10*

The process of Example 9 is repeated using (−)-O:O-di-p-toluoyltartaric acid in place of (+)-O:O-di-p-toluoyltartaric acid. There is thus obtained (−)-1-(2′-naphthyl)-2-(1′-hydroxy-2′-methyl-2′-n-propylamino)ethanol (−)-O:O-di-p-toluoyltartrate, M.P. 162–163° C., $[\alpha]_D^{21} -96.2°$ (c., 1.01 in ethanol).

*Example 11*

1 part of (+)-1-(2′-naphthyl)-2-(1′-hydroxy-2′-methyl-2′-n-propylamino)ethanol (+)-O:O-di-p-toluoyltartrate is treated with 20 parts of N/2 aqueous sodium hydroxide, and the mixture is extracted with 90 parts of ether in three portions. The combined ethereal extracts are washed with 30 parts of water and dried with anhydrous magnesium sulphate. The dried ethereal solution is evaporated to dryness. The residual solid is crystallised from 5 parts of ethyl acetate. There is thus obtained as the free base (+)-1-(2′-naphthyl)-2-(1′-hydroxy-2′-methyl-2′-n-propylamino)ethanol, M.P. 117° C., $[\alpha]_D^{21} +27.6°$ (c., 1.03 in ethanol).

*Example 12*

50 parts of water are added to the filtrate which was retained as described in Example 9. The mixture is filtered and the solid residue is crystallised from aqueous methanol (66% methanol by volume). There is thus obtained (−)-1-(2′-naphthyl)-2-(1′-hydroxy-2′-methyl-2′-n-propylamino)ethanol (+)-O:O-di-p-toluoyltartrate, M.P. 154–155° C., $[\alpha]_D^{21} +57°$ (c., 0.98 in ethanol), which is approximately 90% optically pure.

The process of Example 11 is repeated using the above sample of (−)-1-(2′-naphthyl)-2-(1′-hydroxy-2′-methyl-2′-n-propylamino)ethanol (+)-O:O-di-p-toluoyltartrate in place of (+)-1-(2′-naphthyl)-2-(1′-hydroxy-2′-methyl-2′-n-propylamino)ethanol (+)-O:O-di-p-toluoyltartrate, and there is thus obtained (−)-1-(2′-naphthyl)-2-(1′-hydroxy-2′-methyl-2′-n-propylamino)ethanol, M.P. 117° C., $[\alpha]_D^{21} -22.5°$ (c., 1.07 in ethanol), which is approximately 90% optically pure.

*Example 13*

The process of Example 11 is repeated using (−)-1-(2′-naphthyl)-2-(1′-hydroxy-2′-methyl-2′-n-propylamino)ethanol (−)-O:O-di-p-toluoyltartrate in place of (+)-1-(2′-naphthyl)-2-(1′-hydroxy-2′-methyl-2′-n-propylamino)ethanol (+)-O:O-di-p-toluoyltartrate. There is thus obtained (−)-1-(2′-naphthyl)-2-(1′-hydroxy-2′-methyl-2′-n-propylamino)ethanol, M.P. 117° C., $[\alpha]_D^{21} -26.6°$ (c., 1.00 in ethanol).

*Example 14*

2 parts of sodium borohydride are added during 30 minutes to a stirred solution of 1.74 parts of (+)-1-phenyl-2-n-propylamine and 3 parts of 2-naphthylglyoxal hydrate in 80 parts of methanol at 80° C. After 16 hours, the methanol is evaporated under reduced pressure. 200 parts of N/2 hydrochloric acid are added to the residual gum and the mixture is washed with 100 parts of ether. 25 parts of 8 N sodium hydroxide are added to the aqueous acid layer, and the mixture is extracted with 150 parts of ether in three portions. The combined ethereal extracts are washed with 30 parts of water and then dried with anhydrous magnesium sulphate. The dry ethereal solution is evaporated to dryness. The residual oil is dissolved in 3 parts of ethyl acetate, 20 parts of light petroleum (B.P. 40–60° C.) are added to the solution and the mixture is kept at 0° C. until the separation of solid is substantially complete. The mixture is filtered and the residual solid, M.P. 98–99° C., $[\alpha]_D^{21}$ —1.0° (c., 105 in ethanol) is crystallised several times from ether until the optical rotation becomes constant. There is thus obtained (—)-1-(2'-naphthyl)-2-(1'-phenyl-2'-n-propylamino)ethanol, M.P. 104° C., $[\alpha]_D^{21}$ —18.9° (c., 1.03 in ethanol).

*Example 15*

A solution of 3 parts of (—)-2-amino-1-n-butanol in 8 parts of methanol is aded to a stirred suspension of 5 parts of 2-naphthylglyoxal hydrate in 40 parts of methanol. The resulting solution is cooled to 0° C., and 2 parts of sodium borohydride are added during 1 hour. After 3 hours, the methanol is evaporated under reduced pressure. The residue is shaken with 150 parts of 1 N hydrochloric acid and 100 parts of ether, and the mixture is separated. 25 parts of 8 N sodium hydroxide solution are added to the aqueous acid layer and the mixture is extracted with 120 parts of ether in 3 portions. The combined ethereal extracts are washed with 20 parts of water, dried with anhydrous magnesium sulphate and then evaporated to dryness. The residue is heated under reflux with 80 parts of light petroleum (B.P. 40–60° C.) for 10 minutes, cooled to ambient temperature, and the light petroleum supernatant liquid is decanted from the undissolved material. This undissolved material is stirred at 0° C. with a mixture of 5 parts of ethyl acetate and 20 parts of light petroleum (B.P. 40–60° C.), and after about 15 minutes the undissolved material solidifies. The mixture is filtered and the solid residue is crystallised several times from ethyl acetate until the specific rotation becomes constant. There is thus obtained (—)-1-(2'-naphthyl)-2-1'-hydroxy-2'-n-butyl-amino)ethanol, M.P. 89–90° C., $[\alpha]_D^{21}$ —4.7° (c., 0.99 in ethanol).

*Example 16*

A mixture of 50 parts of (—)-1-(2'-naphthyl)-2-isopropylaminoethanol, 125 part of maize starch, 270 parts of calcium phosphate and 1 part of magnesium stearate is compressed, and the compressed material is then broken down into granules by passage through a 16-mesh screen. The granules so obtained are then compressed into tablets according to the known art. The tablets so obtained are suitable for oral use for therapeutic purposes.

When the 50 parts of (—)-1-(2'-naphthyl)-2-isopropylaminothanol used as starting material in the above process are replaced by 50 parts of (—)-1-(2'-naphthyl)-2-(1'-hydroxy-2'-methyl-2'-n-propylamino)ethanol or by (—)-1-(2'-naphthyl)-2-(1'-phenyl-2'-n-propylamino)ethanol there are likewise obtained tablet compositions which are suitable for oral use for therapeutic purposes.

*Example 17*

The following are typical formulations to provide tablets according to standard pharmaceutical techniques:

(i)

|   | Mg. |
|---|---|
| (—)-1-(2'-naphthyl)-2-isopropylaminoethanol hydrochloride | 200 |
| Lactose | 400 |
| 10% aqueous gelatine solution | 9 |
| Maize starch | 35 |
| Magnesium stearate | 6 |

(ii)

| (—)-1-(2'-naphthyl)-2-isopropylaminoethanol hydrochloride | 100 |
|---|---|
| Lactose | 100 |
| Maize starch | 25 |
| Gelatine | 5 |
| Stearic acid | 2.5 |

(iii)

| (—)-1-(2'-naphthyl)-2-isopropylaminoethanol hydrochloride | 50 |
|---|---|
| Lactose | 150 |
| Maize starch | 25 |
| Talc | 5 |

(iv)

| (—)-1-(2'-naphthyl)-2-isopropylaminoethanol hydrochloride | 500 |
|---|---|
| 10% aqueous gelatine solution | 9 |
| Diatomite | 60 |
| Maize starch | 25 |
| Magnesium stearate | 6 |

(v)

| (—)-1-(2'-naphthyl)-2-isopropylaminoethanol hydrochloride | 5 |
|---|---|
| Lactose | 200 |
| Maize starch | 25 |
| Talc | 5 |

(vi)

| (—)-1-(2'-naphthyl)-2-isopropylaminoethanol hydrochloride | 5 |
|---|---|
| Kaolin | 45 |
| Maize starch | 9 |
| Magnesium stearate | 1 |

(vii)

| (—)-1-(2'-naphthyl)-2-isopropylaminoethanol hydrochloride | 5 |
|---|---|
| Kaolin | 45 |
| Diatomite | 9 |
| Magnesium stearate | 1 |

The (—)-1-(2'-naphthyl)-2-isopropylaminoethanol hydrochloride is mixed with an inert diluent (lactose or kaolin) and is granulated with a binding agent (starch paste, gelatine solution or acacia mucilage). A disintegrating agent (maize starch, diatomite or alginic acid) is mixed with the granules, and there is then added thereto a lubricating agent (magnesium stearate, stearic acid or talc). The mixture is compressed into tablets according to the known art and there are obtained tablets containing 5, 50, 100, 200 or 500 mg. of active ingredients which are suitable for oral administration for therapeutic purposes.

*Example 18*

A solution of 1 part of (—)-1-(2'-naphthyl)-2-isopropylaminoethanol hydrochloride in 100 parts of distilled water is filled into ampoules. The ampoules are sealed and then heated at 115° C. for 30 minutes. There are thus obtained ampoules containing a sterile aqueous solution suitable for parenteral administration for therapeutic purposes.

The above process is repeated except that a solution of 0.1 part of sodium metabisulphite and 1 part of (—)-1-(2'-naphthyl)-2 - isopropylaminoethanol hydrochloride in 100 parts of distilled water is filled into ampoules and then treated as described above. There are thus obtained ampoules containing a sterile aqueous solution suitable for parenteral administration for therapeutic purposes.

*Example 19*

A solution of 1 part of (—)-1-(2'-naphthyl)-2-isopropylaminoethanol hydrochloride in 100 parts of distilled water is passed through a sterilising filter. The sterile filtrate is filled into sterile ampoules under aseptic conditions. There are thus obtained ampoules containing a sterile aqueous solution suitable for parenteral administration for therapeutic purposes.

What I claim is:

1. An optically active naphthalene derivative selected from the group consisting of compounds having the formula:

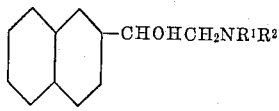

wherein $R^1$ is selected from the group consisting of hydrogen and methyl, and $R^2$ is selected from the group consisting of alkyl of up to four carbon atoms and monohydroxyalkyl of up to four carbon atoms and the non-toxic pharmaceutically-acceptable salts thereof.

2. A compound as claimed in claim 1 wherein $R^1$ is hydrogen and $R^2$ is alkyl of up to 4 carbon atoms.

3. A compound as claimed in claim 1 wherein $R^1$ is hydrogen and $R^2$ is hydroxyalkyl of up to 4 carbon atoms.

4. The compound: (—)-1-(2'-naphthyl)-2 - isopropylaminoethanol.

5. The non-toxic pharmaceutically-acceptable salts of the compound of claim 4.

6. The compound: (—)-1-(2'-naphthyl)-2 - (1' - hydroxy-2'-methyl-2'-n-propylamino)ethanol.

7. The non-toxic pharmaceutically-acceptable salts of the compound of claim 6.

References Cited by the Examiner

UNITED STATES PATENTS

| | | | |
|---|---|---|---|
| 2,774,789 | 12/1956 | Tular | 260—570.6 |
| 2,816,059 | 12/1957 | Mills | 260—570.6 X |
| 2,900,415 | 8/1959 | Biel | 260—570.6 |
| 2,938,921 | 5/1960 | Mills | 260—570.6 |

FOREIGN PATENTS 155,341  2/1954  Australia.

OTHER REFERENCES

Allewelt et al.: "Jour. Org. Chem.," vol. 6, pages 384–400 (1941).

Immediata et al.: "Jour. of Org. Chem.," vol. 5, pages 512–27 (1940).

Osten: "Arzneimittel-Forsch," vol. 5, pages 84–7 (1955).

Radt: "Elsevier's Encyclopedia of Organic Chemistry," vol. 12B, Series III, pages 1119–21 (1950).

Rajagopalan et al.: "Chemical Abstracts," vol. 39, page 3594 (1945).

Saski: "Chemical Abstracts," vol. 53, page 11392 (1959).

Shapiro et al.: "Jour. Amer. Chemical Soc.," vol. 80, pages 6060–4 (1958).

Tular: "Jour. Amer. Chem. Soc.," vol. 70, pages 2067–68 (1948).

CHARLES B. PARKER, *Primary Examiner.*

ROBERT V. HINES, *Assistant Examiner.*